United States Patent
Iwamura

(10) Patent No.: US 12,149,958 B2
(45) Date of Patent: Nov. 19, 2024

(54) CONTROL APPARATUS, COMPUTER READABLE STORAGE MEDIUM, CONTROL METHOD, AND FLYING OBJECT

(71) Applicant: SOFTBANK CORP., Tokyo (JP)

(72) Inventor: Hidetaka Iwamura, Tokyo (JP)

(73) Assignee: SoftBank Corp., Tokyo (JP)

( * ) Notice: Subject to any disclaimer, the term of this patent is extended or adjusted under 35 U.S.C. 154(b) by 165 days.

(21) Appl. No.: 17/713,236

(22) Filed: Apr. 5, 2022

(65) Prior Publication Data
US 2022/0232397 A1    Jul. 21, 2022

Related U.S. Application Data

(63) Continuation of application No. PCT/JP2020/031353, filed on Aug. 19, 2020.

(30) Foreign Application Priority Data

Nov. 7, 2019    (JP) .................. 2019-202493

(51) Int. Cl.
*H04W 16/00*    (2009.01)
*B64U 10/25*    (2023.01)
(Continued)

(52) U.S. Cl.
CPC ............ *H04W 16/32* (2013.01); *B64U 10/25* (2023.01); *H04W 36/322* (2023.05);
(Continued)

(58) Field of Classification Search
CPC ... H04W 16/32; H04W 36/322; H04W 84/06; B64U 10/25; B64U 2201/10; B64U 2201/20; B64U 50/31
See application file for complete search history.

(56) References Cited

U.S. PATENT DOCUMENTS 5,678,184 A    10/1997  Cutler, Jr.
11,075,817 B1 *  7/2021  Trim ................... H04L 41/0896
(Continued)

FOREIGN PATENT DOCUMENTS

CN    108242951 A    7/2018
JP    2002211496 A    7/2002
(Continued)

OTHER PUBLICATIONS (ISA/237) Written Opinion of the International Search Authority for International Patent Application No. PCT/JP2020/031353, issued/mailed by the Japan Patent Office on Nov. 2, 2022.
(Continued)

*Primary Examiner* — Khai M Nguyen

(57) ABSTRACT

Provided is a control apparatus that controls flying objects, each of the flying objects having an antenna arranged to form a cell on a ground and provide wireless communication service to a user terminal in the cell, the control apparatus including a replacement control unit configured to control replacement of a first flying object covering a target area on the ground by a first cell with a second flying object, in which the replacement control unit is configured to control the second flying object in a manner that after a second cell is formed in a part of the target area, the second flying object continuously expands the second cell to continuously broaden a coverage of the target area by the second cell.

20 Claims, 12 Drawing Sheets

(51) Int. Cl.
  *H04W 16/32* (2009.01)
  *H04W 36/32* (2009.01)
  *B64U 50/31* (2023.01)
  *B64U 101/20* (2023.01)
  *H04W 84/06* (2009.01)

(52) U.S. Cl.
  CPC .......... *B64U 50/31* (2023.01); *B64U 2101/20* (2023.01); *B64U 2201/10* (2023.01); *H04W 84/06* (2013.01)

(56) References Cited

U.S. PATENT DOCUMENTS

| | | | | |
|---|---|---|---|---|
| 11,102,717 | B2* | 8/2021 | Cao | H04B 7/18504 |
| 11,166,175 | B2* | 11/2021 | Murphy | H04B 7/18506 |
| 11,171,715 | B2* | 11/2021 | Hirai | G05D 1/0094 |
| 2012/0129527 | A1 | 5/2012 | Takeuchi | |
| 2016/0156406 | A1* | 6/2016 | Frolov | H04W 16/28 |
| | | | | 455/431 |
| 2016/0353238 | A1* | 12/2016 | Gherardi | G01S 1/042 |
| 2017/0208512 | A1 | 7/2017 | Aydin | |
| 2018/0102831 | A1* | 4/2018 | Murphy | H04W 76/11 |
| 2023/0360422 | A1* | 11/2023 | Young | A01K 61/95 |

FOREIGN PATENT DOCUMENTS

| | | | | |
|---|---|---|---|---|
| JP | 2004088654 A | | 3/2004 | |
| JP | 2012114512 A | | 6/2012 | |
| JP | 2017521962 A | | 8/2017 | |
| WO | WO-2020054237 A1 | * | 3/2020 | ........... B64C 39/024 |

OTHER PUBLICATIONS

Office Action issued for counterpart Japanese Application No. 2019-202493, issued by the Japan Patent Office on Jun. 21, 2022(drafted on Jun. 14, 2022).

* cited by examiner

CONTROL APPARATUS, COMPUTER READABLE STORAGE MEDIUM, CONTROL METHOD, AND FLYING OBJECT

The contents of the following Japanese patent application(s) are incorporated herein by reference:
NO. 2019-202493 filed in JP on Nov. 7, 2019
NO. PCT/JP2020/031353 filed in WO on Aug. 19, 2020

BACKGROUND

1. Technical Field

The present invention relates to a control apparatus, a computer readable storage medium, a control method, and a flying object.

2. Related Art

A flying object having an antenna which flies through the stratosphere in order to provide a stratospheric platform has been proposed (see Patent document 1, for example).

RELATED ART LITERATURE

Patent Documents

Patent document 1: Japanese Patent Application Publication No. 2002-211496

Problem to be Solved

It is desirable to provide a technology with which flying object replacement can be appropriately executed.

DESCRIPTION OF EXEMPLARY EMBODIMENTS

Hereinafter, the present invention will be described through embodiments of the invention, but the following embodiments do not limit the invention according to the claims. In addition, not all combinations of the features described in the embodiments necessarily have to be essential to solving means of the invention.

Figure 1:
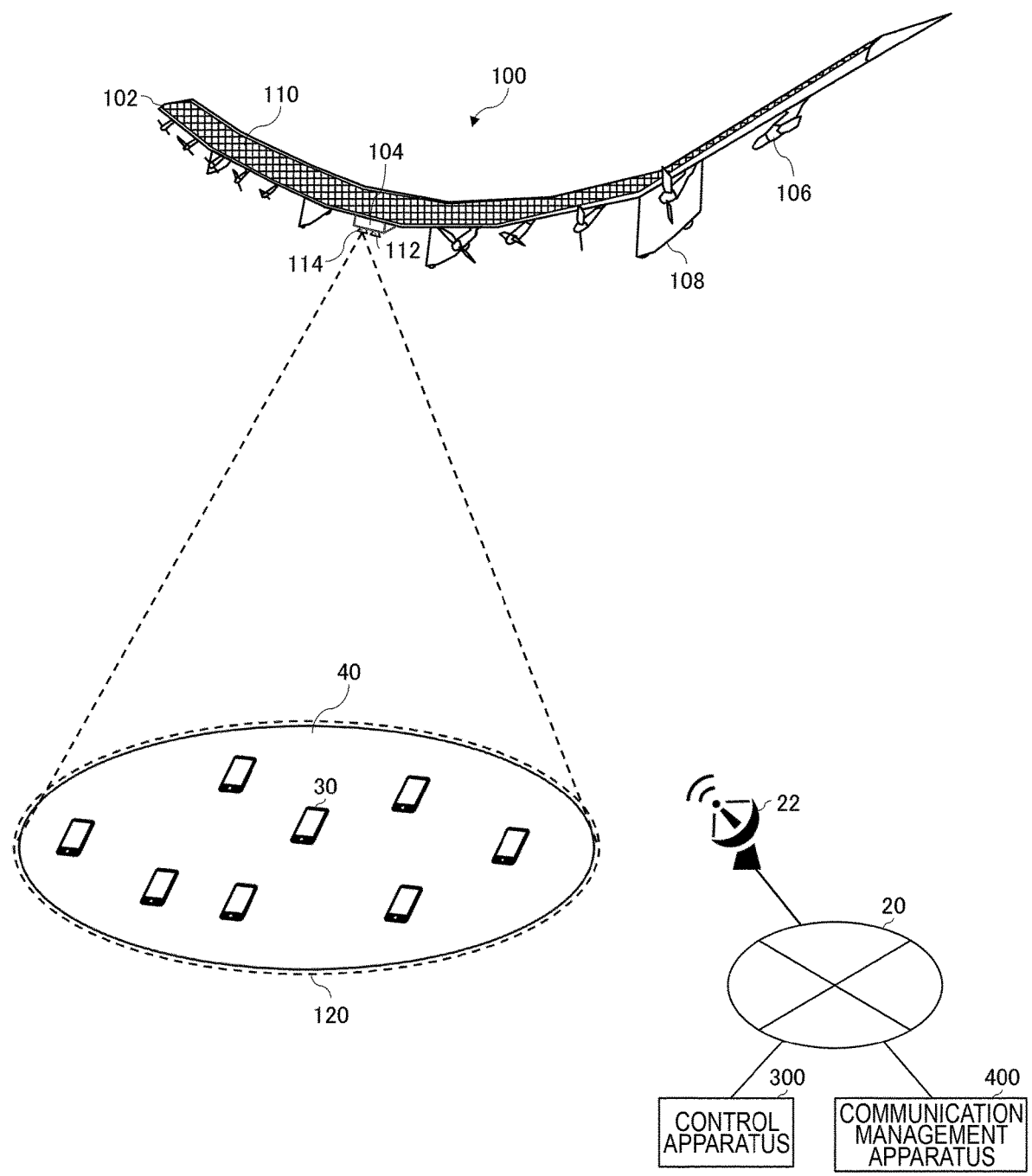
FIG. 1 schematically illustrates one example of a HAPS 100.
Figure 2:
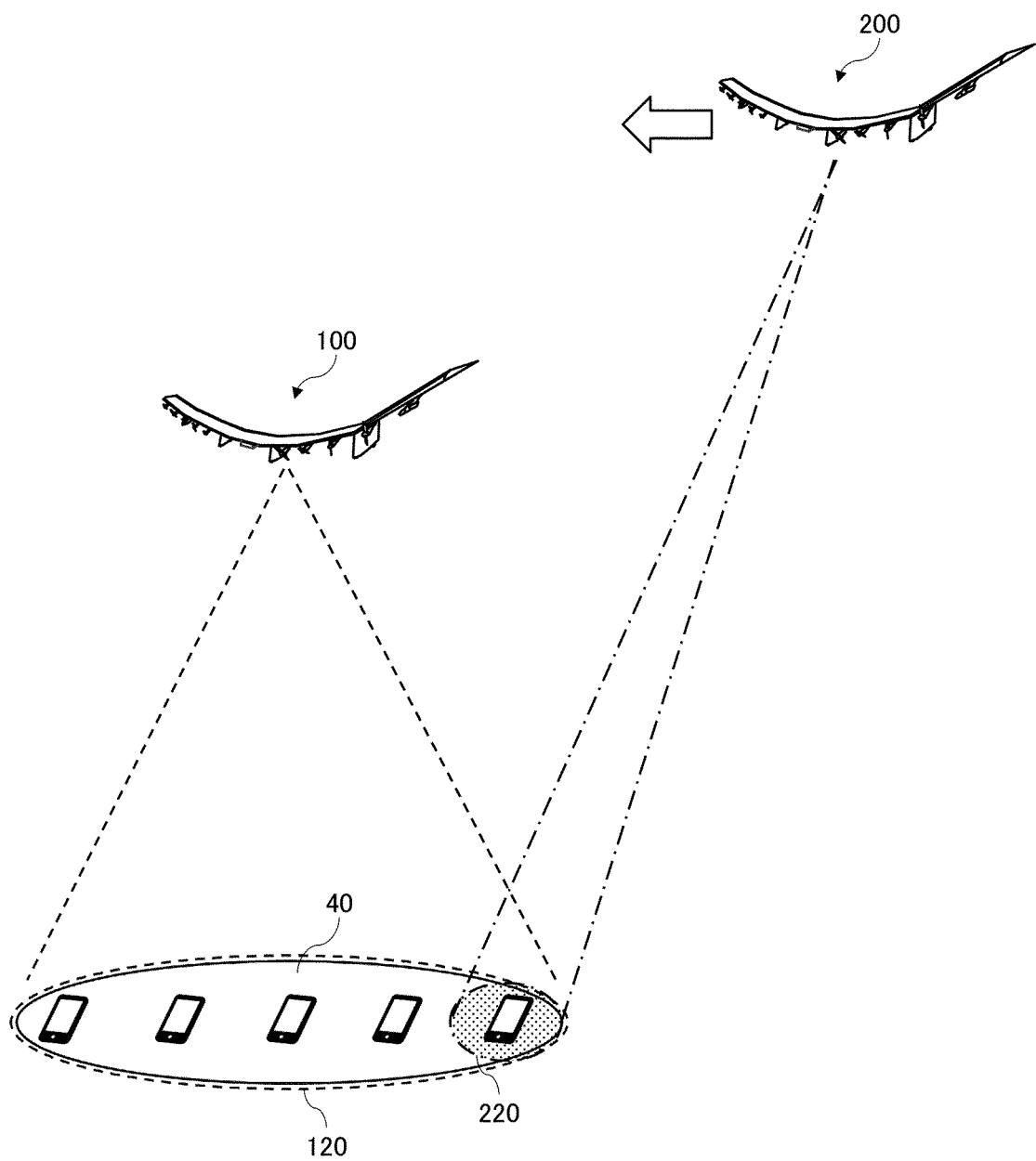
FIG. 2 schematically illustrates one example of a flow of replacement control processing by a control apparatus 300.

FIG. 1 schematically illustrates one example of a high altitude platform station (HAPS) 100. The HAPS 100 may be one example of a flying object having an antenna arranged to form a cell 120 on a ground and provide wireless communication service to a user terminal 30 in the cell 120.

The HAPS 100 includes an object body 102, a central part 104, a propeller 106, a pod 108, and a solar panel 110. A control apparatus 130 which is not illustrated in FIG. 1 is arranged inside the central part 104.

Electric power generated by the solar panel 110 is stored in one or more batteries arranged in at least any of the object body 102, the central part 104, and the pod 108. The electric power stored in the battery is utilized by each of components included in the HAPS 100.

The control apparatus 130 is configured to control flight of the HAPS 100. The control apparatus 130 controls the flight of the HAPS 100 by, for example, controlling rotation of the propeller 106. In addition, the control apparatus 130 may control the flight of the HAPS 100 by changing an angle of a flap or an elevator which are not illustrated in the drawing. The control apparatus 130 may include various types of sensors including positioning sensors such as a GPS sensor, a gyro sensor, and an acceleration sensor, and manage a location, a moving direction, and a moving speed of the HAPS 100.

In addition, the control apparatus 130 is configured to control communication of the HAPS 100. The control apparatus 130 provides the wireless communication service to the user terminal 30 on the ground by using a feeder link (FL) antenna 112 and a service link (SL) antenna 114. The HAPS 100 may provide the wireless communication service to the user terminal 30 on the ground while flying in the stratosphere.

The FL antenna 112 is an antenna for feeder link. The control apparatus 130 forms a feeder link with a gateway 22 on the ground by the FL antenna 112. The control apparatus 130 may access a network 20 via the gateway 22.

The SL antenna 114 is an antenna for a service link. The SL antenna 114 may be an antenna having a lower directivity than the FL antenna 112. The control apparatus 130 forms the cell 120 on the ground by the SL antenna 114. The SL antenna 114 may be a multi beam antenna. The cell 120 may be multiple cells.

The user terminal 30 may be any terminal as long as it is a communication terminal capable of communicating with the HAPS 100. For example, the user terminal 30 is a mobile phone such as a smartphone. The user terminal 30 may be a tablet terminal, a personal computer (PC), and the like. The user terminal 30 may be a so called Internet of Thing (IoT) device. The user terminal 30 may include any entities corresponding to a so called Internet of Everything (IoE).

The HAPS 100 is configured to provide the wireless communication service to the user terminal 30 by relaying, for example, communication between the user terminal 30 and the network 20. The network 20 includes a mobile communication network. The mobile communication network may be in conformity to any of communication standards such as a 3rd generation (3G) communication standard, a Long Term Evolution (LTE) communication standard, a 5th generation (5G) communication standard, and 6th generation (6G) and subsequent communication standards. The network 20 may include the Internet.

The HAPS 100 transmits data received from the user terminal 30 in the cell 120 to the network 20, for example. In addition, when the HAPS 100 receives data addressed to the user terminal 30 in the cell 120 via the network 20, for example, the HAPS 100 transmits the data to the user terminal 30.

The HAPS 100 may access the network 20 via a communication satellite not illustrated in the drawing. In this case, the HAPS 100 has an antenna arranged to communicate with the communication satellite.

The HAPS 100 may be controlled by a control apparatus 300. The HAPS 100 operates according to an instruction transmitted via the network 20 and the gateway 22 by the control apparatus 300, for example. In addition, the HAPS 100 operates according to an instruction transmitted via the communication satellite by the control apparatus 300, for example.

The control apparatus 300 is configured to control the HAPS 100 by transmitting an instruction. The control apparatus 300 may cause the HAPS 100 to circle in the sky above a target area 40 in order to cover the target area 40 on the ground by the cell 120. In order for the HAPS 100 to cover the target area 40, circling in the sky above the target area 40 may be described as fixed point flight. While flying in the sky above the target area 40 in a circular orbit, for example, the HAPS 100 adjusts an orientation direction of the FL antenna 112 to maintain the feeder link with the gateway 22, and adjusts an orientation direction of the SL antenna 114 to maintain the cover of the target area 40 by the cell 120. The control apparatus 300 may cause the HAPS 100 to carry out the fixed point flight for each of a plurality of target areas to cover each of the plurality of target areas.

Communication performed by the user terminal 30 via the HAPS 100 may be managed by a communication management apparatus 400. The communication management apparatus 400 is arranged in a core network of a communication carrier, for example. The communication management apparatus 400 may provide communication information related to the communication performed by the user terminal 30 via the HAPS 100 to the outside. The communication information includes a reception radio wave situation by the user terminal 30. The communication management apparatus 400 may acquire a transmission source of radio waves received by the user terminal 30 and a reception radio wave intensity by referring to, for example, a measurement report (may be referred to as MR) transmitted by the user terminal 30 to the HAPS 100. The communication management apparatus 400 may refer to the MR, for example, by receiving from the HAPS 100 the MR received by the HAPS 100 from the user terminal 30. In a case where the communication management apparatus 400 is arranged in a radio access network (RAN) and is a repeater type, the communication management apparatus 400 may directly refer to the MR. In addition, the communication information includes, for example, communication traffic of the communication executed by the user terminal 30 via the HAPS 100. The communication management apparatus 400 may transmit the communication information to the control apparatus 300 via the network 20. It should be noted that the control apparatus 300 and the communication management apparatus 400 may be integrated with each other. That is, the control apparatus 300 may function as the communication management apparatus 400.

The control apparatus 300 according to the present embodiment executes replacement control processing of replacing the HAPS 100 covering the target area 40 with another HAPS 100. For example, when maintenance of the HAPS 100 covering the target area 40 is to be carried out, the control apparatus 300 replaces the HAPS 100 with the other HAPS 100. In addition, the control apparatus 300 replaces the HAPS 100 covering the target area 40 with the other HAPS 100 according to an instruction of an operator at any timing.

In wireless communication service in related art, radio base stations are installed on a steel tower, a rooftop of a building, and the like, and the service can be provided to a certain area on a semipermanent basis with stable power supply as long as a failure or the like does not occur, but in the case of the HAPS 100, since the battery and the object body have a limited life or the like, it is necessary to periodically perform replacement with the other HAPS 100. Upon replacement, it is necessary to perform cell switching without causing adverse effect to the user terminal 30 on the ground. For example, after radio waves of the HAPS 100 of a replacement target are stopped, when emission of radio waves of the new HAPS 100 is to be started, the user terminal 30 on the ground cannot temporarily utilize the service due to radio wave interruption, and also, since communication concurrently occurs at the start of the radio wave emission, congestion or the like may occur due to excessive load on the network.

For example, when a first HAPS 100 covering the target area 40 by the first cell 120 is to be replaced with a second HAPS 100, the control apparatus 300 according to the present embodiment controls the second HAPS 100 in a manner that the second HAPS 100 forms the second cell 120 in a part of the target area 40 and continuously expands the second cell 120 while approaching a location corresponding the first HAPS 100 to continuously broaden a coverage of the target area 40 by the second cell 120. The control apparatus 300 may control the first HAPS 100 and the second HAPS 100 in a manner that while a state where the first cell 120 is partially overlapped with the second cell 120 is maintained, the first HAPS 100 continuously reduces the first cell 120, and the second HAPS 100 continuously expands the second cell 120.

FIG. 2 to FIG. 5 schematically illustrate one example of a flow of replacement control processing by the control apparatus 300. Herein, for distinguishment, a HAPS to be replaced is set as a HAPS 100, a replacing HAPS is set as a HAPS 200, a cell formed by the HAPS 100 is set as a cell 120, and a cell formed by the HAPS 200 is set as a cell 220.

The control apparatus 300 controls the HAPS 100 and the HAPS 200 in a manner that the HAPS 100 is to be replaced with the HAPS 200 by appropriately transmitting instructions to the HAPS 100 and the HAPS 200, for example. The control apparatus 300 may transmit a necessary instruction to each of the HAPS 100 and the HAPS 200 at necessary timing. In addition, the control apparatus 300 may transmit a series of instructions used for replacement control to the HAPS 100 and the HAPS 200 in advance. In this case, the HAPS 100 and the HAPS 200 operate according to a series of received instructions. Here, descriptions will be provided by mainly exemplifying a case where the control apparatus 300 appropriately transmits the instructions.

The control apparatus 300 understands locations of the HAPS 100 and the HAPS 200 by periodically receiving location information from each of the HAPS 100 and the HAPS 200. First, the control apparatus 300 causes the HAPS 100 to set the cell 220 of the HAPS 200 as a neighboring cell for a cell setting of the HAPS 100.

In addition, the control apparatus 300 causes the HAPS 200 to set the cell 120 of the HAPS 100 as a neighboring cell for a cell setting of the HAPS 200. It should be noted that the cell setting of the HAPS 200 may be set by an operator on the ground or the like before the HAPS 200 takes off.

In this manner, by causing each of the HAPS 100 and the HAPS 200 to set the mutual cells as the neighboring cells, smooth cell reselection and handover from the cell 120 to the cell 220 can be performed.

First, the control apparatus 300 transmits an instruction to the HAPS 200 so as to move to a location corresponding to the HAPS 100. The location corresponding to the HAPS 100 may be optionally determined. For example, a location above the HAPS 100 is determined as the location corresponding to the HAPS 100. The HAPS 200 starts to move to the location corresponding to the HAPS 100 according to the received instruction.

The control apparatus 300 causes the HAPS 200 to form the cell 220 in a part of the target area 40 in response to a state where a distance between the HAPS 200 and the location corresponding to the HAPS 100 is equal to or shorter than a predetermined distance. The control apparatus 300 may cause the HAPS 200 to form the cell 220 in a part on an outer edge side of the target area 40. For example, the control apparatus 300 instructs a location where the cell 220 is to be formed and a size of the cell 220 to the HAPS 200. The HAPS 200 operates so as to form the cell 220 with the instructed size at the instructed location. It should be noted that the control apparatus 300 may transmit a parameter necessary to form the cell 220 to the HAPS 200. For example, the control apparatus 300 instructs an emission direction of beam and a width of the beam to the HAPS 200. The HAPS 200 adjusts the beam of the SL antenna 114 according to the received parameter.

The control apparatus 300 controls the HAPS 100 and the HAPS 200 in a manner that a reception radio wave intensity from the cell 220 by the user terminal 30 is higher than a reception radio wave intensity from the cell 120 by the user terminal 30 in a section where the cell 120 is overlapped with the cell 220. For example, the control apparatus 300 causes the HAPS 200 to increase a radio wave output intensity or causes the HAPS 100 to decrease a radio wave output intensity.

The control apparatus 300 controls the HAPS 100 and the HAPS 200 in a manner that, for example, the HAPS 100 and the HAPS 200 output radio waves at a precalculated intensity to set the reception radio wave intensity from the cell 220 to be higher than the reception radio wave intensity from the cell 120. In addition, for example, the control apparatus 300 acquires a reception radio wave situation by the user terminal 30 from the communication management apparatus 400 in the section where the cell 120 is overlapped with the cell 220, and when the reception radio wave intensity from the cell 120 is higher than the reception radio wave intensity from the cell 220, performs an adjustment or the like to cause the HAPS 200 to increase the radio wave output intensity such that the reception radio wave intensity from the cell 220 is to be higher than the reception radio wave intensity from the cell 120.

When the control is performed to set the reception radio wave intensity from the cell 220 to be higher than the reception radio wave intensity from the cell 120 by the user terminal 30 in the overlapped section where the cell 120 is overlapped with the cell 220, the cell reselection and handover of the user terminal 30 in the section can be realized, and connection of the user terminal 30 can be switched from the cell 120 to the cell 220.

Figure 3:
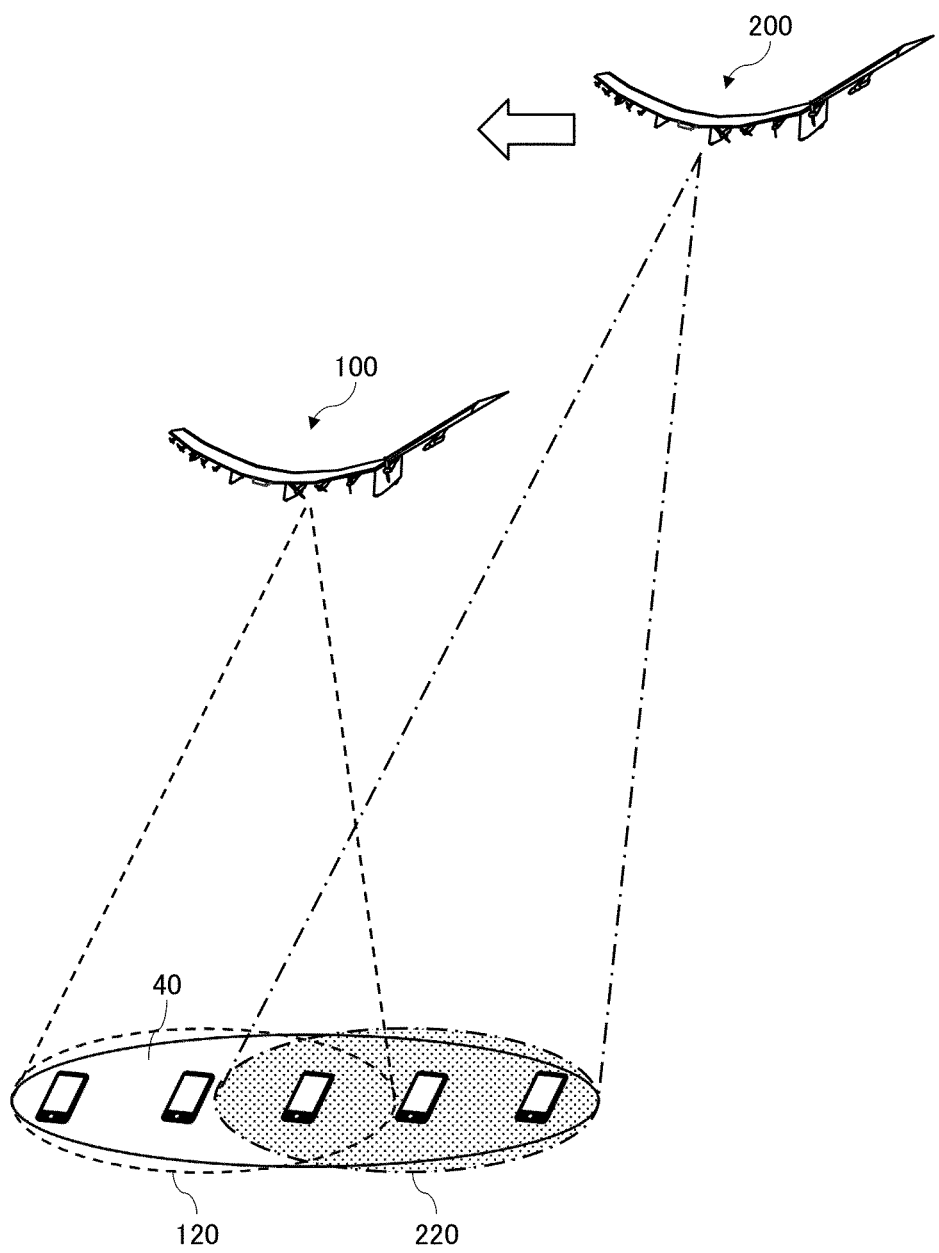
FIG. 3 schematically illustrates one example of the flow of the replacement control processing by the control apparatus 300.
Figure 4:
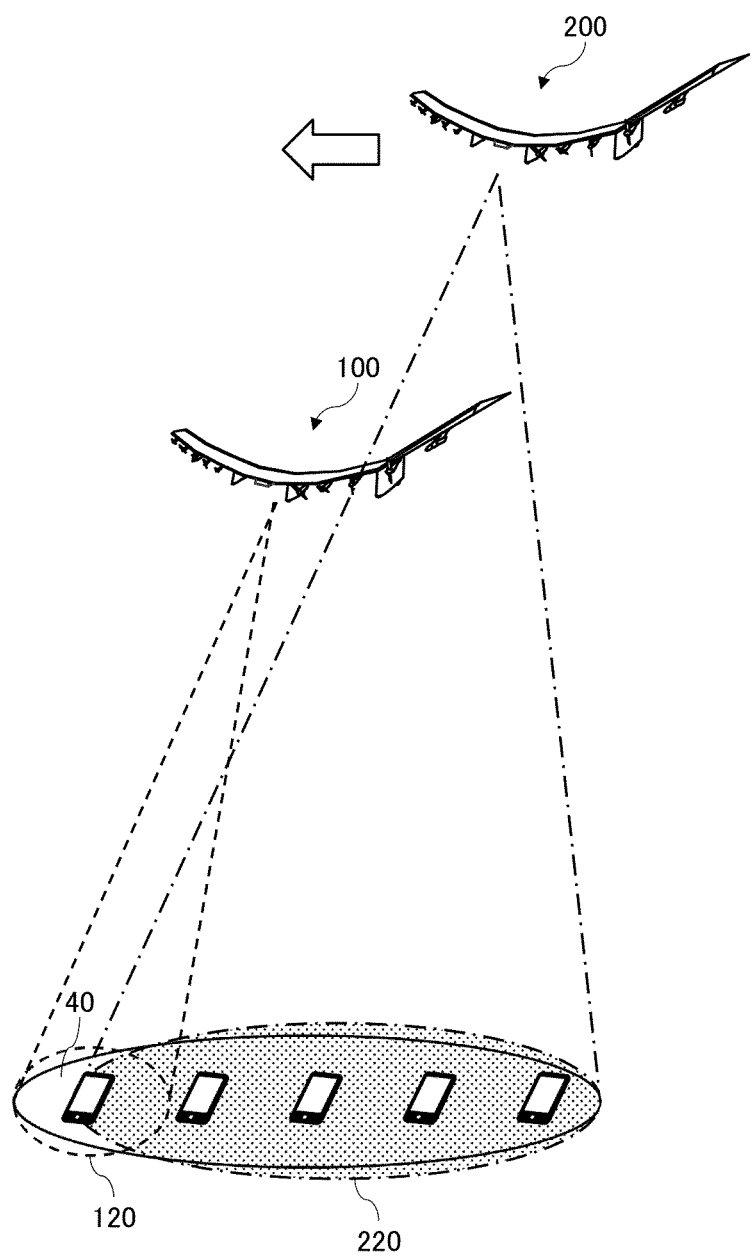
FIG. 4 schematically illustrates one example of the flow of the replacement control processing by the control apparatus 300.

As illustrated in FIG. 3 and FIG. 4, the control apparatus 300 controls the HAPS 100 and the HAPS 200 in a manner that while a state where the cell 120 is partially overlapped with the cell 220 is maintained, the HAPS 200 continuously expands the cell 220 to continuously broaden a coverage of the target area 40 by the cell 220, and the HAPS 100 continuously reduces the cell 120 to continuously narrow a coverage of the target area 40 by the cell 120. The control apparatus 300 may control the HAPS 200 in a manner that the cell 220 is continuously expanded from a first section on an outer edge side of the target area 40 where the cell 220 is formed towards a second section facing the first section on the outer edge side of the target area 40, and may control the HAPS 100 in a manner that the cell 120 is continuously reduced from the first section towards the second section.

The control apparatus 300 may cause the HAPS 100 to reduce the cell 120 while confirming that the user terminal 30 located in the overlapped section where the cell 120 is overlapped with the cell 220 switches the connection destination from the cell 120 to the cell 220. For example, the control apparatus 300 causes the HAPS 100 to reduce the cell 120 in a manner that after all the user terminals 30 present in the cell 120 in the overlapped section where the cell 120 is overlapped with the cell 220 in the target area 40 switch the connection destination to the cell 220 by the cell reselection or handover, the cell 120 is to depart from the overlapped section.

Figure 5:
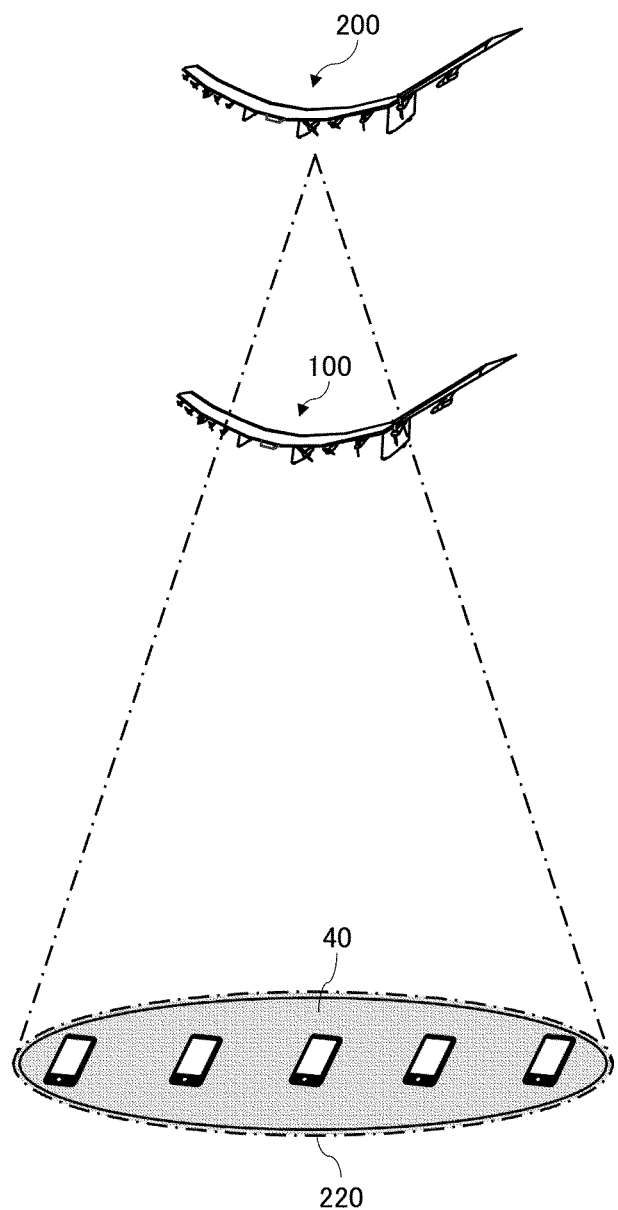
FIG. 5 schematically illustrates one example of the flow of the replacement control processing by the control apparatus 300.

As illustrated in FIG. 5, after an entirety of the target area 40 is covered by the cell 220, the control apparatus 300 may control the HAPS 100 to stop formation of the cell 120. After the entirety of the target area 40 is covered by the cell 220, the control apparatus 300 may control the HAPS 100 in a manner that after it is confirmed that the connection destination of all the user terminals 30 in the target area 40 is switched from the cell 120 to the cell 220, the formation of the cell 120 is to be stopped.

The control apparatus 300 then controls the HAPS 100 so as to move to a predetermined location on the ground. The predetermined location may be optionally determined, and for example, a location in the vicinity of a facility for carrying out maintenance of the HAPS 100, a storage for storing the HAPS 100, or the like may be set.

When the above described replacement processing is executed, it is possible to cause the HAPS 100 to stop the formation of the cell 120 after the user terminal 30 present in the cell 120 switches the connection destination from the cell 120 to the cell 220, and the user terminal 30 can receive the service by the HAPS 200 in succession to the service by the HAPS 100. That is, in accordance with the control apparatus 300 according to the present embodiment, temporary service interruption or temporary service quality degradation occurring in the user terminal 30 can be suppressed.

The example in which the cell 220 is expanded from a part on the outer edge side of the target area 40 has been described with reference to FIG. 2 to FIG. 5, but is not limited to this. The control apparatus 300 may cause the HAPS 200 to expand the cell 220 from a part inside the target area 40.

Figure 6:
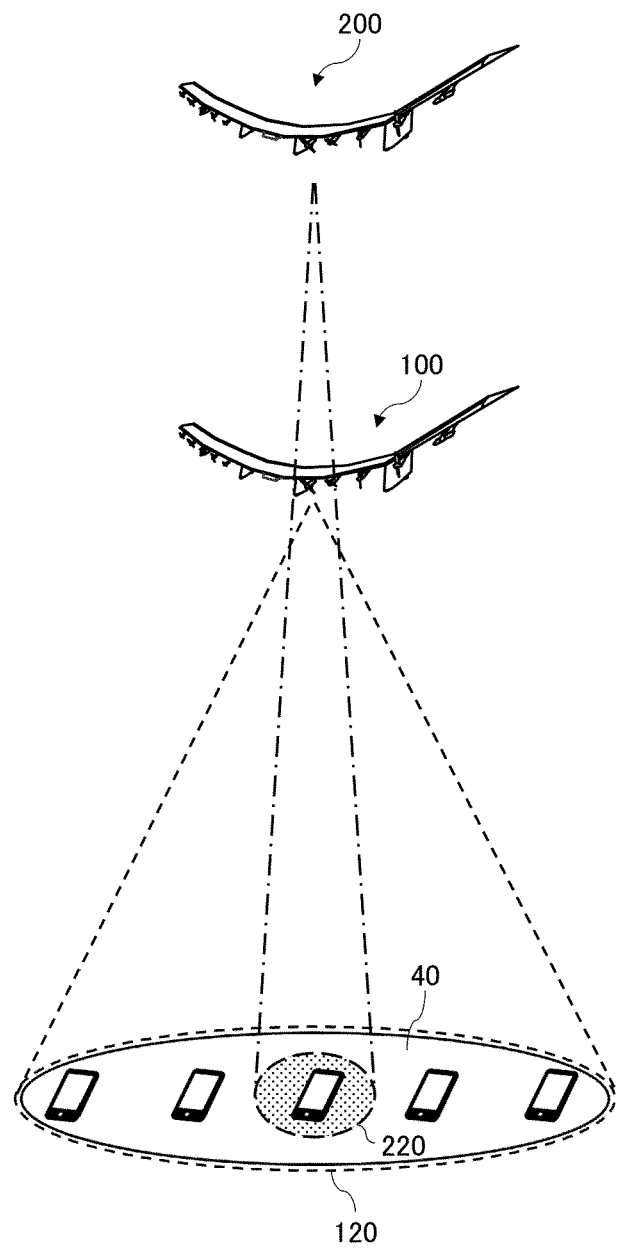
FIG. 6 schematically illustrates another example of the flow of the replacement control processing by the control apparatus 300.
Figure 7:
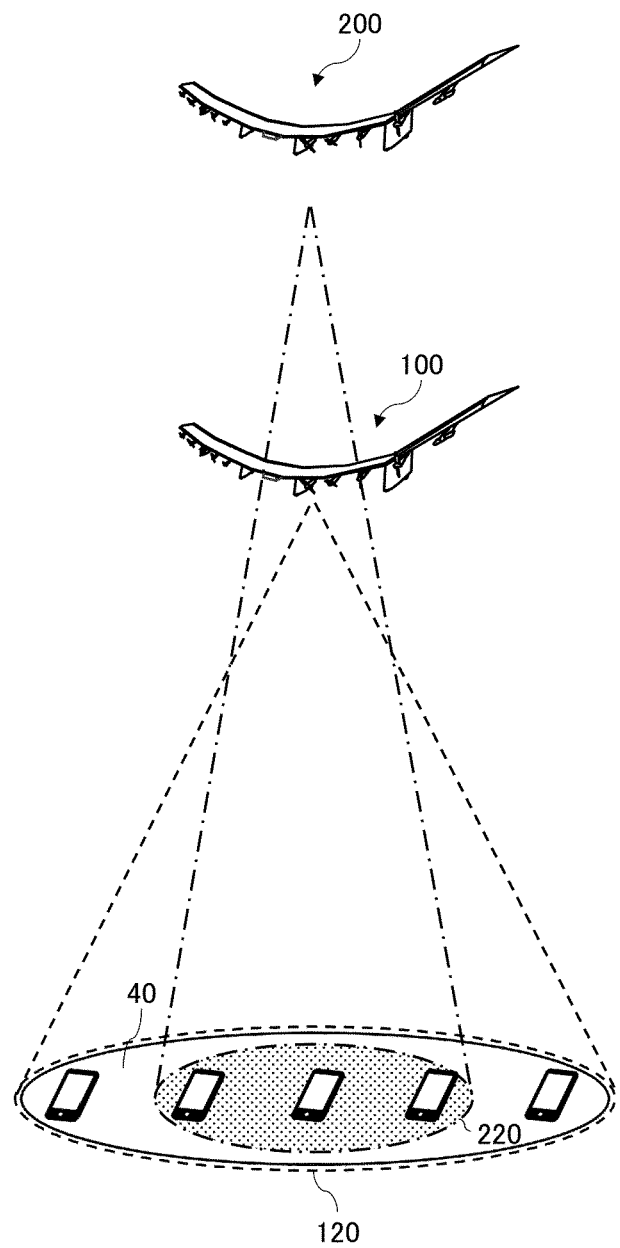
FIG. 7 schematically illustrates another example of the flow of the replacement control processing by the control apparatus 300.

FIG. 6 and FIG. 7 schematically illustrate another example of the flow of the replacement control processing by the control apparatus 300. Here, a different aspect from FIG. 2 to FIG. 5 will be mainly described. In FIG. 6 and FIG. 7, an example will be illustrated in which after the HAPS 200 moves to a location above the HAPS 100, the HAPS 200 forms the cell 220 inside the target area 40 and expands the cell 220.

In a state where the HAPS 100 covers the entirety of the target area 40 by the cell 120, the control apparatus 300 causes the HAPS 200 to form the cell 220 in a part inside the target area 40. Then, in a state where the HAPS 100 covers the entirety of the target area 40 by the cell 120, the control apparatus 300 causes the HAPS 200 to continuously expand the cell 220. The control apparatus 300 controls the HAPS 100 and the HAPS 200 in a manner that the reception radio wave intensity from the cell 220 is higher than the reception radio wave intensity from the cell 120 by the user terminal 30 located in the overlapped section where the cell 120 is overlapped with the cell 220 in the target area 40.

The control apparatus 300 controls the HAPS 100 and the HAPS 200 in a manner that, for example, the radio waves are output at a precalculated intensity to set the reception radio wave intensity from the cell 220 to be higher than the reception radio wave intensity from the cell 120 by the user terminal 30. In addition, for example, the control apparatus 300 acquires the reception radio wave situation by the user terminal 30 in the section where the cell 120 is overlapped with the cell 220 from the communication management apparatus 400, and when the reception radio wave intensity from the cell 120 is higher than the reception radio wave intensity from the cell 220, performs an adjustment or the like to cause the HAPS 200 to increase the radio wave output intensity such that the reception radio wave intensity from the cell 220 is to be higher than the reception radio wave intensity from the cell 120 by the user terminal 30.

After the entirety of the target area 40 is covered by the cell 220, the control apparatus 300 may control the HAPS 100 to stop the formation of the cell 120. After the entirety of the target area 40 is covered by the cell 220, the control apparatus 300 may control the HAPS 100 in a manner that after it is confirmed that the connection destination of all the user terminals 30 in the target area 40 is switched from the cell 120 to the cell 220, the formation of the cell 120 is to be stopped. The control apparatus 300 then controls the HAPS 100 so as to move to the predetermined location on the ground.

Figure 8:
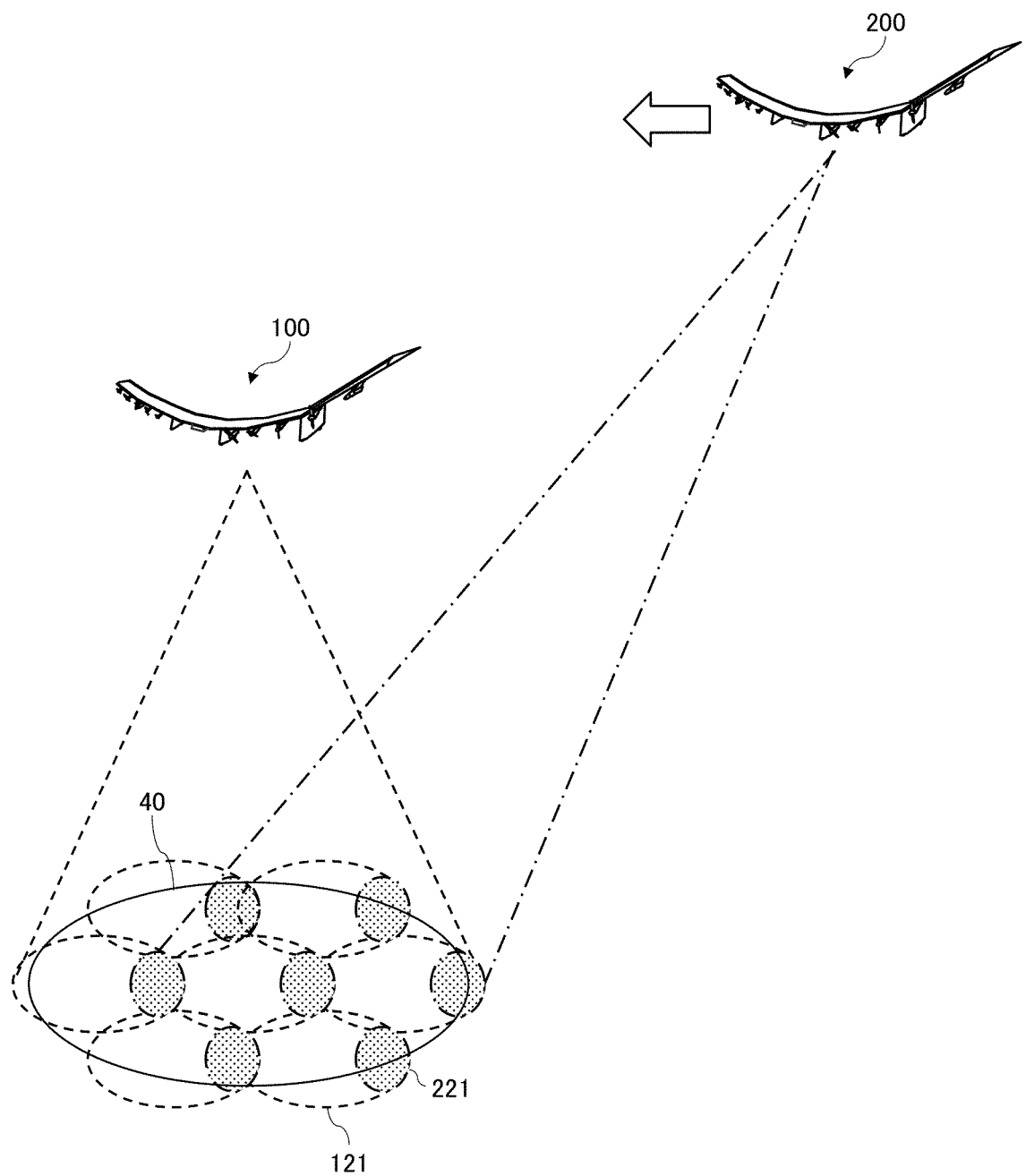
FIG. 8 schematically illustrates another example of the flow of the replacement control processing by the control apparatus 300.

FIG. 8 schematically illustrates another example of the flow of the replacement control processing by the control apparatus 300. In FIG. 8, the flow of the replacement control processing will be described in a case where the HAPS 100 forms the cell 120 configured by a plurality of sub cells 121, and the HAPS 200 is caused to form the cell 220 configured by a plurality of sub cells 221. Here, a part different from the example illustrated in FIG. 2 to FIG. 5 will be mainly described.

First, the control apparatus 300 controls the HAPS 200 in a manner that each of the plurality of sub cells 221 is formed in a part on an outer edge side of an area covered by each of the plurality of sub cells 121. The control apparatus 300 then control the HAPS 100 and the HAPS 200 in a manner that while a state where each of the plurality of sub cells 121 is partially overlapped with each of the plurality of sub cells 221 is maintained, the HAPS 100 continuously reduces each of the plurality of sub cells 121, and the HAPS 200 expands each of the plurality of sub cells 221.

Figure 9:
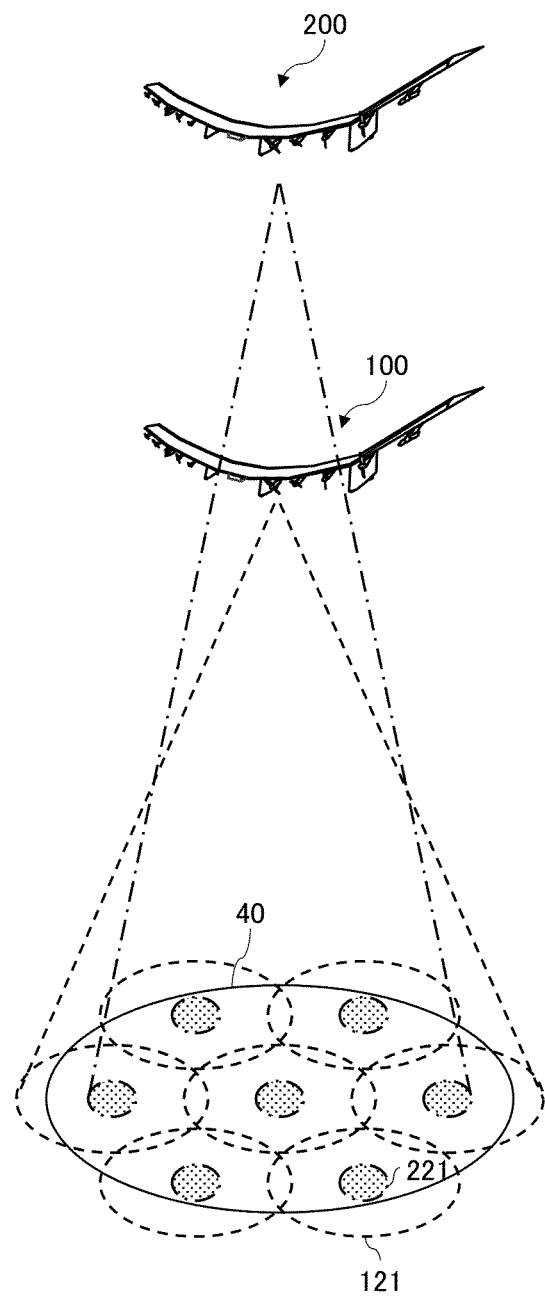
FIG. 9 schematically illustrates another example of the flow of the replacement control processing by the control apparatus 300.

FIG. 9 schematically illustrates another example of the flow of the replacement control processing by the control apparatus 300. In FIG. 9, the flow of the replacement control processing will be described in a case where the HAPS 100 forms the cell 120 configured by the plurality of sub cells 121, and the HAPS 200 is caused to form the cell 220 configured by the plurality of sub cells 221. Here, a part different from the example illustrated in FIG. 6 and FIG. 7 will be mainly described.

The control apparatus 300 controls the HAPS 200 in a manner that in a state where the HAPS 100 covers the entirety of the target area 40 by the plurality of sub cells 121, each of the plurality of sub cells 221 is formed in a part inside the area covered by each of the plurality of sub cells 121. The control apparatus 300 then controls the HAPS 200 so as to continuously expand each of the plurality of sub cells 221.

Figure 10:
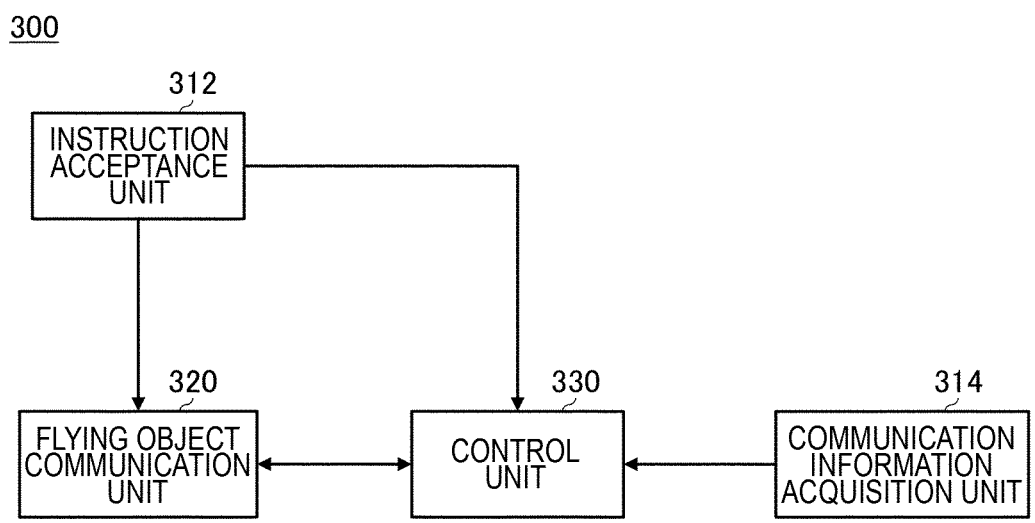
FIG. 10 schematically illustrates one example of a functional configuration of the control apparatus 300.

FIG. 10 schematically illustrates one example of a functional configuration of the control apparatus 300. The control apparatus 300 includes an instruction acceptance unit 312, a communication information acquisition unit 314, a flying object communication unit 320, and an control unit 330.

The instruction acceptance unit 312 is configured to accept various types of instructions. The instruction acceptance unit 312 accepts an instruction for designating the target area 40, for example. In addition, for example, the instruction acceptance unit 312 accepts an instruct for designating a trajectory for the HAPS 100 to perform the fixed point flight. In addition, for example, the instruction acceptance unit 312 accepts an instruction for designating a location where the cell 120 is to be formed.

The instruction acceptance unit 312 may accept an instruction input via an operation unit included in the control apparatus 300. In addition, the instruction acceptance unit 312 may accept an instruction received via the network 20, via a communication unit included in the control apparatus 300.

The communication information acquisition unit 314 is configured to acquire communication information related to communication in the wireless communication service provided by the cell 120 formed by the HAPS 100 to the user terminal 30. The communication information acquisition unit 314 acquires, for example, a reception radio wave situation by the user terminal 30. In addition, the communication information acquisition unit 314 acquires, for example, information related to the communication traffic. The communication information acquisition unit 314 may receive the communication information from the communication management apparatus 400.

The flying object communication unit 320 is configured to communicate with the HAPS 100. The flying object communication unit 320 may communicate with the HAPS 100 via the network 20 and the gateway 22. The flying object communication unit 320 may communicate with the HAPS 100 via a communication satellite.

The flying object communication unit 320 transmits, for example, the instruction accepted by the instruction acceptance unit 312 to the HAPS 100. In addition, the flying object communication unit 320 receives, for example, various types of information from the HAPS 100. The flying object communication unit 320 receives, for example, location information of the HAPS 100 from the HAPS 100.

The control unit 330 is configured to execute various types of controls. The control unit 330 performs various types of settings for the HAPS 100 via the flying object communication unit 320, for example. When, for example, replacement of the first HAPS 100 with the second HAPS 100 is to be performed, the control unit 330 transmits cell identification information of the cell 120 of the second HAPS 100 to the first HAPS 100 to cause the first HAPS 100 to set the second cell 120 as a neighboring cell. In addition, the control unit 330 transmits cell identification information of the cell 120 of the first HAPS 100 to the second HAPS 100 to cause the second HAPS 100 to set the first cell 120 as a neighboring cell. The control unit 330 may be one example of a setting control unit.

The control unit 330 may execute replacement control processing of the HAPS 100. The control unit 330 may be one example of the replacement control unit. The control unit 330 may control the HAPS 100 by transmitting various types of instructions to the HAPS 100 via the flying object communication unit 320. The control unit 330 may transmit a plurality of instructions to the HAPS 100 in accordance with each timing, and may also transmit a plurality of instructions to the HAPS 100 at once.

The control unit 330 may control the replacement of the first HAPS 100 covering the target area 40 on the ground by the first cell 120 with the second HAPS 100. For example, the control unit 330 controls the second HAPS 100 in a manner that after the second HAPS 100 moving towards a location corresponding to a location of the first HAPS 100 is caused to form the second cell 120 in a part of the target area 40, the second cell 120 is continuously expanded to continuously broaden the coverage of the target area 40 by the second cell 120.

The control unit 330 may control the second HAPS 100 in a manner that after the second cell 120 is formed in a part of the target area 40, the second HAPS 100 continuously expands the second cell 120 while moving towards the location corresponding to the location of the first HAPS 100 to continuously broaden the coverage of the target area 40 by the second cell 120. The control unit 330 may control the first HAPS 100 and the second HAPS 100 in a manner that while a state where the first cell 120 is partially overlapped with the second cell 120 is maintained, the first HAPS 100 continuously reduces the first cell 120, and the second HAPS 100 continuously expands the second cell 120.

The control unit 330 may control the first HAPS 100 in a manner that the first HAPS 100 continuously expands the first cell 120 by beamforming. For example, for the first HAPS 100, the control unit 330 transmits an instruction for continuously expanding the first cell 120 by beamforming to the first HAPS 100. In addition, for example, the control unit 330 may transmit a control parameter of beamforming for continuously expanding the first cell 120 to the first HAPS 100. For example, the control unit 330 determines a direction and a width of beam from a location of the target area 40 and a location and a flight direction of the first HAPS 100, and generates and transmits a control parameter of beamforming for realizing the direction and the width of the beam to the first HAPS 100.

The control unit 330 may control the second HAPS 100 in a manner that the second HAPS 100 continuously reduces the second cell 120 by beamforming. For example, for the second HAPS 100, the control unit 330 transmits an instruction for continuously reducing the second cell 120 by beamforming to the second HAPS 100. In addition, for example, the control unit 330 may transmit a control parameter of beamforming for continuously reducing the second cell 120 to the second HAPS 100. The control unit 330 determines a direction and a width of beam from, for example, a location of the target area 40 and a location and a flight direction of the second HAPS 100, and generates and transmits a control parameter of beamforming for realizing the direction and the width of the beam to the second HAPS 100.

The control unit 330 may control the second HAPS 100 in a manner that the second HAPS 100 forms the second cell 120 in a first section on the outer edge side of the target area 40, and continuously expands the second cell 120 from the first section towards a second section facing the first section on the outer edge side of the target area 40. In addition, the control unit 330 may control the first HAPS 100 in a manner that the first HAPS 100 continuously reduces the first cell 120 from the first section towards the second section. After the user terminal 30 present in the first cell 120 in the overlapped section where the first cell 120 is overlapped with the second cell 220 in the target area 40 switches the connection destination to the second cell 120, the control unit 330 may cause the first HAPS 100 to reduce the first cell 120 such that the first cell 120 is to depart from the overlapped section.

The control unit 330 may control the first HAPS 100 and the second HAPS 100 in a manner that at a speed at which fluctuation per unit time of a number of at least one user terminal 30 that switches the connection destination from the first cell 120 to the second cell 120 is within a predetermined range, the first HAPS 100 reduces the first cell 120, and the second HAPS 100 expands the second cell 120. The control unit 330 acquires a switching situation of the connection destination from the first cell 120 to the second cell 120 from the communication management apparatus 400 via the communication information acquisition unit 314 while, for example, executing the reduction of the first cell 120 and the expansion of the second cell 120. The control unit 330 then continually identifies the number per unit time of the user terminals 30 that switch the connection destination from the first cell 120 to the second cell 120. In a case where the number per unit time which is continually identified is about to exceed a predetermined upper limit number, the control unit 330 may decrease at least any of a reduction speed of the first cell 120 and an expansion speed of the second cell 120. In addition, in a case where the number per unit time which is continually identified is about to fall below a predetermined lower limit number, the control unit 330 may increase at least any of the reduction speed of the first cell 120 and the expansion speed of the second cell 120. With this configuration, it is possible to avoid excessive increase or decrease in the number of user terminals 30 that switch the connection destination from the first cell 120 to the second cell 120 in a same time period, and disturbance in a communication environment can be suppressed.

The control unit 330 may control the first HAPS 100 and the second HAPS 100 in a manner that a reduction speed of the first cell 120 and an expansion speed of the second cell 120 in an area where communication by the user terminals 30 is more congested are slower than a reduction speed of the first cell 120 and an expansion speed of the second cell 120 in an area where communication by the user terminals 30 is less congested in the target area 40. The control unit 330 acquires the communication traffic of the communication by the user terminals 30 from the communication management apparatus 400 via the communication information acquisition unit 314 in each section of the target area 40, for example. The control unit 330 then controls the first HAPS 100 and the second HAPS 100 in a manner that a reduction speed of the first cell 120 and an expansion speed of the second cell 120 in an area where there is more communication traffic are slower than a reduction speed of the first cell 120 and an expansion speed of the second cell 120 in an area where there is less communication traffic. With this configuration, it is possible to suppress deterioration in user sensory quality due to adverse effect in the communication environment which is caused by frequent switching of the connection destination despite a state where the communication is congested, and the replacement of the HAPS 100 can be promptly realized at timing at which the communication environment is hardly affected.

The control unit 330 may control the first HAPS 100 in a manner that after the entirety of the target area 40 is covered by the second cell 120, the first HAPS 100 stops the formation of the first cell 120.

The control unit 330 may determine timing at which the replacement control processing of the first HAPS 100 with the second HAPS 100 is to be executed based on various types of situations. For example, the control unit 330 confirms a fluctuation situation of the communication traffic for one day in the target area 40 covered by the first HAPS 100 of the replacement target based on communication information acquired by the communication information acquisition unit 314 from the communication management apparatus 400, and selects a time slot with less communication traffic as a time slot in which the replacement control processing is to be executed.

The control unit 330 may determine the timing at which the replacement control processing is to be executed according to a type of the target area 40 covered by the first HAPS 100 of the replacement target. For example, the control unit 330 determines the timing at which the replacement control processing is to be executed at night in a case where the target area 40 is a metropolitan important area, and determines the timing at which the replacement control processing is to be executed without temporal restrictions in a case where the target area 40 is not an important area.

When the first cell 120 is configured by a plurality of sub cells 121, the control unit 330 may control the first HAPS 100 and the second HAPS 100 in a manner that while a state where each of the plurality of sub cells 121 configuring the first cell 120 is partially overlapped with each of a plurality of sub cells 121 configuring the second cell 120 is maintained, the first HAPS 100 continuously reduces each of the plurality of sub cells 121 of the first cell 120, and the second HAPS 100 continuously expands each of the plurality of sub cells 121 of the second cell 120.

The control unit 330 may control the first HAPS 100 and the second HAPS 100 in a manner that in a state where the first HAPS 100 covers the entirety of the target area 40 by the first cell 120, the second HAPS 100 continuously expands the second cell 120.

The control unit 330 may control the second HAPS 100 in a manner that the second HAPS 100 forms the second cell 120 in a first section inside the target area 40, and continuously expands the second cell 120 from the first section towards the outward direction of the target area. The control unit 330 may control the first HAPS 100 and the second HAPS 100 in a manner that the reception radio wave intensity from the second cell 120 is higher than the reception radio wave intensity from the first cell 120 by the user terminal 30 located in the overlapped section where the first cell 120 is overlapped with the second cell 120 in the target area 40.

When the first cell 120 is configured by the plurality of sub cells 121, the control unit 330 may control the first HAPS 100 and the second HAPS 100 in a manner that in a state where the first HAPS 100 covers the entirety of the target area 40 by the plurality of sub cells 121 configuring the first cell 120, the second HAPS 100 forms the second cell 120 configured by a plurality of sub cells 121 each of which is included in each of the plurality of sub cells 121 of the first cell 120, and continuously expands the plurality of sub cells 121 of the second cell 120.

Figure 11:
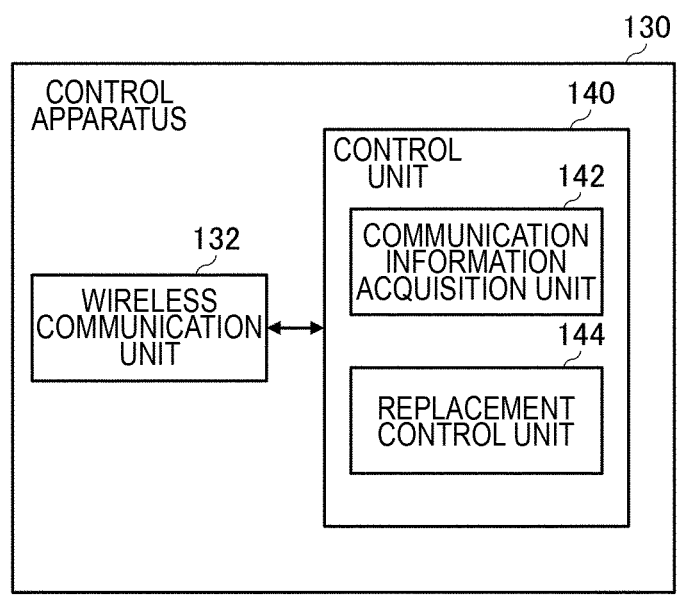
FIG. 11 schematically illustrates one example of a functional configuration of a control apparatus 130 included in the HAPS 100.

FIG. 11 schematically illustrates one example of a functional configuration of the control apparatus 130 included in the HAPS 100. The control apparatus 130 includes a wireless communication unit 132 and a control unit 140.

The wireless communication unit 132 is configured to execute various types of communications. The wireless communication unit 132 may form a feeder link with the gateway 22 on the ground by using the FL antenna 112. The wireless communication unit 132 may access the network 20 via the gateway 22. The wireless communication unit 132 communicates with the control apparatus 300 and the communication management apparatus 400 via, for example, the gateway 22 and the network 20.

The wireless communication unit 132 may form the cell 120 on the ground by using the SL antenna 114. The wireless communication unit 132 may communicate with the user terminal 30 by forming a service link with the user terminal 30. The wireless communication unit 132 may execute communication with a communication satellite.

The control unit 140 is configured to control flight of the HAPS 100. In addition, the control unit 140 is configured to control communication by the wireless communication unit 132. The control unit 140 may control the flight and communication of the HAPS 100 according to an instruction from the control apparatus 300.

The control unit 140 has a communication information acquisition unit 142 and a replacement control unit 144. The communication information acquisition unit 142 is configured to acquire communication information related to communication in the wireless communication service provided by the cell 120 formed by the HAPS 100 to the user terminal 30. The communication information acquisition unit 142 acquires, for example, a reception radio wave situation by the user terminal 30. In addition, the communication information acquisition unit 142 acquires, for example, information related to communication traffic. The communication information acquisition unit 142 may acquire communication information from the communication management apparatus 400 via the wireless communication unit 132.

The replacement control unit 144 is configured to control replacement with another HAPS 100. When, for example, its own flying object (the HAPS 100 to which the replacement control unit 144 is mounted may be referred to as its own flying object) covers the target area 40 by the first cell 120 formed by the wireless communication unit 132 while performing fixed point flight in the sky above the target area 40 on the ground, the replacement control unit 144 executes replacement control processing of replacing its own flying object with the other HAPS 100 to cover the target area 40.

The replacement control unit 144 controls its own flying object in a manner that the first cell 120 is continuously reduced in accordance with a state where the other HAPS 100 forms the second cell 120 in a part of the target area 40 and continuously expands the second cell 120 while moving towards a location corresponding to a location of its own flying object. The replacement control unit 144 may control the SL antenna 114 so as to continuously reduce the first cell 120 by beamforming.

The replacement control unit 144 may control its own flying object in a manner that in accordance with a state where the other HAPS 100 forms the second cell 120 in a first section on the outer edge side of the target area 40 and continuously expands the second cell 120 from the first section towards a second section facing the first section on the outer edge side of the target area 40, the first cell 120 is continuously reduced from the first section towards the second section.

The replacement control unit 144 may control its own flying object in a manner that while a state where the first cell 120 is partially overlapped with the second cell 120 is maintained, the first cell 120 is continuously reduced. The replacement control unit 144 may control its own flying object in a manner that after the user terminal 30 present in the first cell 120 in the overlapped section where the first cell 120 is overlapped with the second cell 120 in the target area 40 switches the connection destination to the second cell 120, the first cell 120 is reduced to cause the first cell 120 to depart from the overlapped section.

The replacement control unit 144 may control its own flying object so as to reduce the first cell 120 at a speed at which fluctuation per unit time of a number of at least one user terminal 30 that switches the connection destination from the first cell 120 to the second cell 120 is within a predetermined range. The replacement control unit 144 may also control its own flying object in a manner that a reduction speed of the first cell 120 in an area where communication by the user terminals 30 is more congested is slower than a reduction speed of the first cell 120 in an area where communication by the user terminals 30 is less congested in the target area 40. The replacement control unit 144 may control its own flying object in a manner that after the second cell 120 covers the entirety of the target area 40, the formation of the first cell 120 is to be stopped.

The replacement control unit 144 may execute various types of controls according to an instruct of the control apparatus 300, for example. In addition, the replacement control unit 144 may execute various types of controls while communicating with the other HAPS 100. Its own flying object may communicate with the other HAPS 100 via the gateway 22 and the network 20, via a communication satellite, or via the control apparatus 300.

The replacement control unit 144 may also execute replacement processing of replacing the other HAPS 100 covering the target area 40 on the ground by the first cell 120 with its own flying object to cover the target area 40. The replacement control unit 144 may control its own flying object in a manner that, for example, after the second cell 120 is formed in a part of the target area 40, the second cell 120 is continuously expanded to continuously broaden a coverage of the target area 40 by the second cell 120.

The replacement control unit 144 may control its own flying object in a manner that after the second cell 120 is formed, its own flying object continuously expands the second cell 120 while moving towards a location corresponding to a location of the other HAPS 100 to continuously broaden the coverage of the target area 40 by the second cell 120. The replacement control unit 144 may control the SL antenna 114 so as to continuously expand the second cell 120 by beamforming.

The replacement control unit 144 may control its own flying object in a manner that while a state where the first cell 120 is partially overlapped with the second cell 120 is maintained, the second cell 120 is continuously expanded. The replacement control unit 144 may control its own flying object in a manner that the second cell 120 is formed in a first section on the outer edge side of the target area 40, and the second cell 120 is continuously expanded from the first section towards a second section facing the first section on the outer edge side of the target area 40.

The replacement control unit 144 may control its own flying object so as to continuously expand the second cell 120 at a speed at which fluctuation per unit time of a number of at least one user terminal 30 that switches the connection destination from the first cell 120 to the second cell 120 is within a predetermined range. The replacement control unit 144 may also control its own flying object in a manner that an expansion speed of the second cell 120 in an area where communication by the user terminals 30 is more congested is set to be slower than an expansion speed of the second cell 120 in an area where communication by the user terminals 30 is less congested in the target area 40.

The replacement control unit 144 may also control its own flying object so as to continuously expand the second cell 120 in a state where the other HAPS 100 covers the entirety of the target area 40 by the first cell 120. The replacement control unit 144 may control its own flying object in a manner that the second cell 120 is formed in a first section inside the target area 40, and the second cell 120 is continuously expanded from the first section towards an outward direction of the target area 40. The replacement control unit 144 may control its own flying object in a manner that the reception radio wave intensity from the second cell 120 is higher than the reception radio wave intensity from the first cell 120 by the user terminal 30 in a location in the overlapped section where the first cell 120 is overlapped with the second cell 120 in the target area 40.

Figure 12:
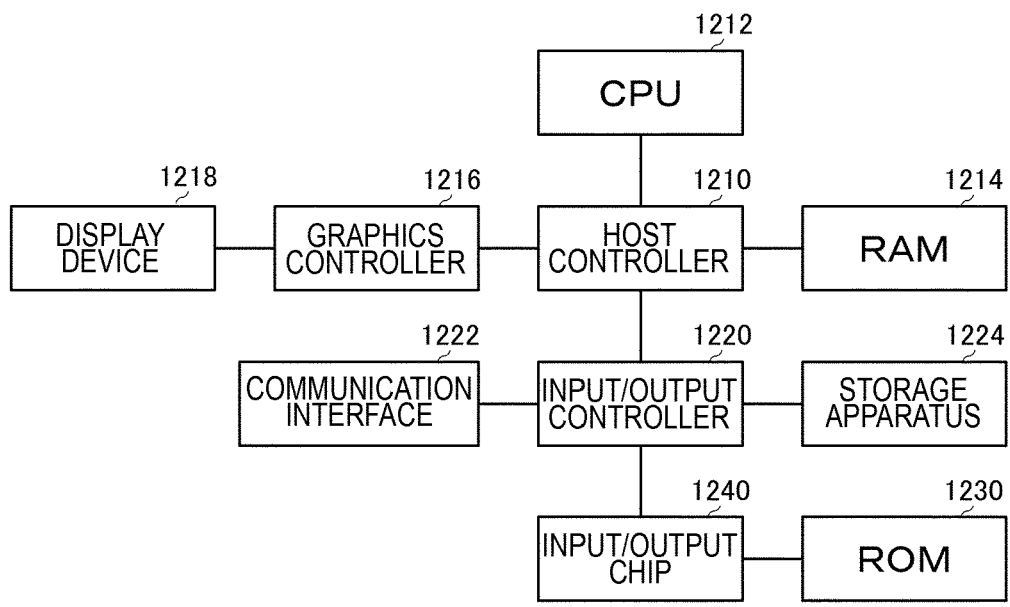
FIG. 12 schematically illustrates one example of a hardware configuration of a computer 1200 configured to function as the control apparatus 130 or the control apparatus 300.

FIG. 12 schematically illustrates one example of a hardware configuration of a computer 1200 which functions as the control apparatus 130 or the control apparatus 300. A program that is installed in the computer 1200 can cause the computer 1200 to function as one or more units in an apparatus of the present embodiment, or cause the computer 1200 to execute operations associated with the apparatus of the present embodiment or the one or more units thereof, and/or cause the computer 1200 to execute processes of the present embodiment or steps thereof. Such program may be executed by a CPU 1212 so as to cause the computer 1200 to execute certain operations associated with some or all of the blocks of flowcharts and block diagrams described herein.

The computer 1200 in accordance with the present embodiment includes a CPU 1212, a RAM 1214, and a graphics controller 1216, which are mutually connected by a host controller 1210. The computer 1200 also includes input and output units such as a communication interface 1222, a storage apparatus 1224, a DVD drive and an IC card drive, which are connected to the host controller 1210 via an input and output controller 1220. The storage apparatus 1224 may be a hard disk drive, a solid state drive, and the like. The computer 1200 also includes legacy input and output units such as a ROM 1230 and a keyboard, which are connected to the input and output controller 1220 via an input and output chip 1240.

The CPU 1212 is configured to operate according to programs stored in the ROM 1230 and the RAM 1214, thereby controlling each unit. The graphics controller 1216 is configured to acquire image data generated by the CPU 1212 on a frame buffer or the like provided in the RAM 1214 or in itself, and to cause the image data to be displayed on a display device 1218.

The communication interface 1222 is configured to communicate with other electronic devices via a network. The storage apparatus 1224 is configured to store programs and data used by the CPU 1212 within the computer 1200. The DVD drive is configured to read the programs or the data from a DVD-ROM or the like, and to provide the storage apparatus 1224 with the programs or the data. The IC card drive is configured to read programs and data from an IC card, and/or to write programs and data into the IC card.

The ROM 1230 is configured to store therein a boot program or the like that is executed by the computer 1200 at the time of activation, and/or a program depending on the hardware of the computer 1200. The input and output chip 1240 may also be configured to connect various input and output units to the input and output controller 1220 via a USB port, a parallel port, a serial port, a keyboard port, a mouse port and the like.

A program is provided by a computer readable storage medium such as a DVD-ROM or an IC card. The program is read from the computer readable storage medium, is installed into the storage apparatus 1224, RAM 1214, or ROM 1230, which are also examples of computer readable storage medium, and is executed by the CPU 1212. The information processing described in these programs is read into the computer 1200, resulting in cooperation between a program and the above mentioned various types of hardware resources. An apparatus or method may be constituted by realizing the operation or processing of information in accordance with the usage of the computer 1200.

For example, when communication is performed between the computer 1200 and an external device, the CPU 1212 may execute a communication program loaded onto the RAM 1214 to instruct communication processing to the communication interface 1222, based on the processing described in the communication program. The communication interface 1222, under control of the CPU 1212, reads transmission data stored on a transmission buffer region provided in a recording medium such as the RAM 1214, the storage apparatus 1224, the DVD-ROM, or the IC card, and transmits the read transmission data to a network or writes reception data received from a network to a reception buffer region or the like provided on the recording medium.

In addition, the CPU 1212 may be configured to cause all or a necessary portion of a file or a database, which has been stored in an external recording medium such as the storage apparatus 1224, the DVD drive (DVD-ROM), the IC card and the like, to be read into the RAM 1214, thereby executing various types of processing on the data on the RAM 1214. The CPU 1212 may be configured to then write back the processed data to the external recording medium.

Various types of information, such as various types of programs, data, tables, and databases, may be stored in the recording medium to undergo information processing. The CPU 1212 may also be configured to execute various types of processing on the data read from the RAM 1214, which includes various types of operations, processing of information, condition judging, conditional branching, unconditional branching, search/replacement of information and the like described in the present disclosure and designated by an instruction sequence of programs, and to write the result back to the RAM 1214. The CPU 1212 may also be configured to search for information in a file, a database, etc., in the recording medium. For example, when a plurality of entries, each having an attribute value of a first attribute associated with an attribute value of a second attribute, is stored in the recording medium, the CPU 1212 may search for an entry matching the condition whose attribute value of the first attribute is designated, from the plurality of entries, and read the attribute value of the second attribute stored in the entry, thereby obtaining the attribute value of the second attribute associated with the first attribute satisfying the predetermined condition.

The above described program or software modules may be stored in the computer readable storage medium on or near the computer 1200. In addition, a recording medium such as a hard disk or a RAM provided in a server system connected to a dedicated communication network or the Internet can be used as the computer readable storage medium, thereby providing the programs to the computer 1200 via the network.

In the present embodiment, blocks of the flowcharts and the block diagrams may represent steps of processes in which operations are executed or units of apparatuses responsible for performing operations. Certain steps and units may be implemented by dedicated circuitry, programmable circuitry supplied with computer readable instructions stored on computer readable storage media, and/or processors supplied with computer readable instructions stored on computer readable storage media. Dedicated circuitry may include digital and/or analog hardware circuits and may include integrated circuits (IC) and/or discrete circuits. Programmable circuitry may include, for example, reconfigurable hardware circuits comprising logical AND, OR, XOR, NAND, NOR, and other logical operations, flip-flops, registers, and memory elements, such as field-programmable gate arrays (FPGA), programmable logic arrays (PLA), etc.

Computer readable storage medium may include any tangible device that can store instructions for execution by a suitable device, such that the computer readable storage medium having instructions stored therein comprises an article of manufacture including instructions which can be performed to create means for performing operations specified in the flowcharts or block diagrams. Examples of a computer readable storage medium may include an electronic storage medium, a magnetic storage medium, an optical storage medium, an electromagnetic storage medium, a semiconductor storage medium, etc. More specific examples of a computer readable storage medium may include a floppy (registered trademark) disk, a diskette, a hard disk, a random access memory (RAM), a read only memory (ROM), an erasable programmable read only memory (EPROM or Flash memory), an electrically erasable programmable read only memory (EEPROM), a static random access memory (SRAM), a compact disc read only memory (CD-ROM), a digital versatile disk (DVD), a BLU-RAY (registered trademark) disc, a memory stick, an integrated circuit card, etc.

Computer readable instructions may include any of assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk (registered trademark), JAVA (registered trademark), C++, etc., and conventional procedural programming languages, such as the "C" programming language or similar programming languages.

Computer readable instructions may be provided to a processor of a general purpose computer, special purpose computer, or other programmable data processing apparatus, or to programmable circuitry, locally or via a local area network (LAN), wide area network (WAN) such as the Internet, etc., so that the processor of the general purpose computer, special purpose computer, or other programmable data processing apparatus, or the programmable circuitry performs the computer readable instructions to create means for performing operations specified in the flowcharts or block diagrams. Examples of processors include computer processors, processing units, microprocessors, digital signal processors, controllers, microcontrollers, etc.

While the embodiments of the present invention have been described, the technical scope of the present invention is not limited to the above described embodiments. It is apparent to persons skilled in the art that various alterations or improvements can be added to the above described embodiments. It is also apparent from the scope of the claims that the embodiments added with such alterations or improvements can be included in the technical scope of the present invention.

The operations, procedures, steps, stages, and the like of each process performed by an apparatus, system, program, and method illustrated in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

20: network, 22: gateway, 30: user terminal, 40: target area, 100: HAPS, 102: object body, 104: central part, 106: propeller, 108: pod, 110: solar panel, 112: FL antenna, 114: SL antenna, 120: cell, 121: sub cell, 200: HAPS, 220: cell, 221: sub cell, 300: control apparatus, 312: instruction acceptance unit, 314: communication information acquisition unit, 320: flying object communication unit, 330: control unit, 400: communication management apparatus, 1200: computer, 1210: host controller, 1212: CPU, 1214: RAM, 1216: graphics controller, 1218: display device, 1220: input and output controller, 1222: communication interface, 1224: storage apparatus, 1230: ROM, 1240: input and output chip

What is claimed is:

1. A control apparatus that controls flying objects, each of the flying objects having an antenna arranged to form a cell on a ground and provide wireless communication service to a user terminal in the cell, the control apparatus comprising:
a replacement control unit configured to control replacement of a first flying object covering a target area on the ground by a first cell with a second flying object, wherein
the replacement control unit is configured to control the second flying object in a manner that after a second cell is formed in a part of the target area, the second flying object continuously expands the second cell to continuously broaden a coverage of the target area by the second cell.

2. The control apparatus according to claim 1, wherein the replacement control unit is configured to control the second flying object in a manner that after the second cell is formed in the part of the target area, the second flying object continuously expands the second cell while moving towards a location corresponding to a location of the first flying object to continuously broaden the coverage of the target area by the second cell.

3. The control apparatus according to claim 1, wherein the replacement control unit is configured to control the first flying object and the second flying object in a manner that while a state in which the first cell is partially overlapped with the second cell is maintained, the first flying object continuously reduces the first cell, and the second flying object continuously expands the second cell.

4. The control apparatus according to claim 3, wherein the replacement control unit is configured to control the first flying object and the second flying object in a manner that the first flying object continuously expands the first cell by beamforming, and the second flying object continuously expands the second cell by beamforming.

5. The control apparatus according to claim 3, wherein the replacement control unit is configured to control the second flying object in a manner that the second flying object forms the second cell in a first section on an outer edge side of the target area and continuously expands the second cell from the first section towards a second section facing the first section on the outer edge side of the target area, and the replacement control unit is configured to control the first flying object in a manner that the first flying object continuously reduces the first cell from the first section towards the second section.

6. The control apparatus according to claim 5, wherein the replacement control unit is configured to control the first flying object in a manner that after a user terminal present in the first cell in an overlapped section where the first cell is overlapped with the second cell in the target area switches a connection destination to the second cell, the first flying object reduces the first cell to cause the first cell to depart from the overlapped section.

7. The control apparatus according to claim 6, wherein the replacement control unit is configured to control the first flying object and the second flying object in a manner that at a speed at which fluctuation per unit time of a number of at least one user terminal that switches the connection destination from the first cell to the second cell is within a predetermined range, the first flying object reduces the first cell, and the second flying object expands the second cell.

8. The control apparatus according to claim 6, wherein the replacement control unit is configured to control the first flying object and the second flying object in a manner that a reduction speed of the first cell and an expansion speed of the second cell in an area where communication by the user terminals is more congested are slower than a reduction speed of the first cell and an expansion speed of the second cell in an area where communication by the user terminals is less congested in the target area.

9. The control apparatus according to claim 2, wherein the replacement control unit is configured to control the first flying object and the second flying object in a manner that while a state in which each of a plurality of sub cells configuring the first cell is partially overlapped with each of a plurality of sub cells configuring the second cell is maintained, the first flying object continuously reduces each of the plurality of sub cells of the first cell, and the second flying object continuously expands each of the plurality of sub cells of the second cell.

10. The control apparatus according to claim 1, wherein the replacement control unit is configured to control the first flying object and the second flying object in a manner that in a state where the first flying object covers an entirety of the target area by the first cell, the second flying object continuously expands the second cell.

11. The control apparatus according to claim 10, wherein the replacement control unit is configured to control the second flying object in a manner that the second flying object forms the second cell in a first section on an inner side of the target area and continuously expands the second cell from the first section towards an outward direction of the target area.

12. The control apparatus according to claim 10, wherein the replacement control unit is configured to control the first flying object and the second flying object in a manner that a reception radio wave intensity from the second cell is set to be higher than a reception radio wave intensity from the first cell by a user terminal located within an overlapped section where the first cell is overlapped with the second cell in the target area.

13. The control apparatus according to claim 10, wherein the replacement control unit is configured to control the first flying object and the second flying object in a manner that in a state where the first flying object covers the entirety of the target area by a plurality of sub cells configuring the first cell, the second flying object forms the second cell configured by a plurality of sub cells each of which is included in each of the plurality of sub cells of the first cell and continuously expands the plurality of sub cells of the second cell.

14. The control apparatus according to claim 1, comprising:
a setting control unit configured to transmit cell identification information of the second cell to the first flying object to cause the first flying object to set the second cell as a neighboring cell.

15. The control apparatus according to claim 14, wherein the setting control unit is configured to transmit cell identification information of the first cell to the second flying object to cause the second flying object to set the first cell as a neighboring cell.

16. The control apparatus according to claim 1, wherein the replacement control unit is configured to control the first flying object and the second flying object in a manner that after the second cell is continuously expanded to cause the second cell to cover the entirety of the target area, the first flying object stops forming the first cell.

17. A non-transitory computer readable storage medium having stored thereon a program that causes a computer to function as a control apparatus that controls flying objects, each of the flying objects having an antenna arranged to form a cell on a ground and provide wireless communication service to a user terminal in the cell, the control apparatus comprising:
a replacement control unit configured to control replacement of a first flying object covering a target area on the ground by a first cell with a second flying object, wherein
the replacement control unit is configured to control the second flying object in a manner that after a second cell is formed in a part of the target area, the second flying object continuously expands the second cell to continuously broaden a coverage of the target area by the second cell.

18. A control method of controlling flying objects, each of the flying objects having an antenna arranged to form a cell on a ground and provide wireless communication service to a user terminal in the cell, the control method comprising:
controlling replacement of a first flying object covering a target area on the ground by a first cell with a second flying object, wherein
the controlling is to control the second flying object in a manner that after a second cell is formed in a part of the target area, the second flying object continuously expands the second cell to continuously broaden a coverage of the target area by the second cell.

19. A flying object having an antenna arranged to form a cell on a ground and provide wireless communication service to a user terminal in the cell, the flying object comprising:
a replacement control unit configured to execute replacement processing of replacing another flying object covering a target area on a ground by a first cell with its own flying object to cover the target area, wherein
the replacement control unit is configured to control the antenna in a manner that after a second cell is formed in a part of the target area, the second cell is continuously expanded to continuously broaden a coverage of the target area by the second cell.

20. A flying object having an antenna arranged to form a cell on a ground and provide wireless communication service to a user terminal in the cell, the flying object comprising:
a replacement control unit configured to execute, when its own flying object covers a target area on a ground by a first cell, replacement processing of replacing its own flying object with another flying object to cover the target area, wherein
the replacement control unit is configured to control the antenna in a manner that the first cell is continuously reduced in accordance with a state where the other flying object forms a second cell in a part of the target area and continuously expands the first cell while moving towards a location corresponding a location of its own flying object.

* * * * *